April 18, 1933. F. KISSING 1,904,475
VALVE CONTROL MECHANISM
Filed Sept. 23, 1931
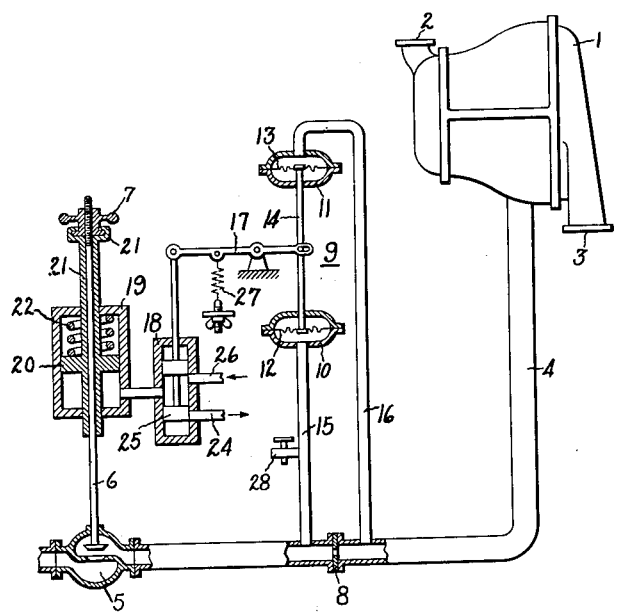
Inventor:
Friedrich Kissing,
by Charles E. Tullar
His Attorney.

Patented Apr. 18, 1933

1,904,475

UNITED STATES PATENT OFFICE

FRIEDRICH KISSING, OF BERLIN-CHARLOTTENBURG, GERMANY, ASSIGNOR TO GENERAL ELECTRIC COMPANY, A CORPORATION OF NEW YORK

VALVE CONTROL MECHANISM

Application filed September 23, 1931, Serial No. 564,617, and in Germany October 14, 1930.

The present invention refers to a valve control mechanism and has for its object an improved construction and arrangement for closing and opening a valve in response to the flow of fluid conveyed by a conduit.

For a consideration of what I believe to be novel and my invention, attention is directed to the following description and the claims appended thereto.

In the drawing, the figure is a diagrammatic view, with certain parts in section, of a structure embodying my invention.

Referring to the drawing, in which I have shown by way of example a valve mechanism applied to an extraction conduit of a turbine, 1 indicates an elastic fluid turbine having an inlet 2 and an exhaust 3. 4 is a conduit for supplying steam from an intermediate stage to any apparatus external of the turbine (not shown). Provided in this conduit is a valve 5 having a stem 6 and a hand-wheel 7 on the upper end of the stem for manually positioning the valve.

In many cases it is desirable to close valve 5 when the flow of fluid through conduit 4 decreases to a certain value in order to prevent back flow of the fluid. For this purpose I provide according to my invention a throttling device in the conduit, in the present instance shown as being arranged ahead of valve 5 as far as the flow of fluid is concerned, and comprising a restriction 8. Arranged with respect to this restriction is a differential pressure responsive device 9, shown as comprising two casings 10 and 11 separated in upper and lower halves by diaphragms 12 and 13 respectively. The diaphragms are connected with each other by a rod 14. 15 and 16 are two conduits connecting casings 10 and 11 to conduit 4 behind and ahead of restriction 8 respectively. Thus it will be seen that rod 14 moves in response to the fluid pressure difference with respect to restriction 8, that is, in response to flow in conduit 4. Pivotally connected to rod 14 is a fulcrumed lever 17 having its left end connected to the stem of pilot valve 18 which forms a control means for a fluid-actuated motor comprising a cylinder 19, a piston 20 movably arranged therein which is integrally formed with a sleeve 21 surrounding stem 6, and has an upper flanged portion 21' forming a guide for hand-wheel 7, the latter being screw-threaded with the upper part of stem 6 to the effect that turning thereof causes movement of valve 5. 22 is a spring provided in the upper half of cylinder 19 and normally forcing piston 20 in a downward direction. 24 is a conduit in the pilot valve to permit draining off of oil from the cylinder and being normally covered by the lower pilot valve head 25. 26 is a conduit, normally uncovered, for supplying oil or like liquid under pressure to the lower part of cylinder 19. An intermediate point of fulcrumed lever 17 is connected to an adjustable tensioned spring 27.

The operation of the mechanism is as follows: The valve stem 6 can be adjusted manually by turning handwheel 7 independently of the oil pressure in cylinder 19. It will be understood that turning of hand-wheel 7 causes up or downward movement of stem 6 without effecting movement of piston 20.

If the fluid pressure difference with respect to restriction 8 decreases to a certain minimum value due to a decreased flow in conduit 4 which may be caused by a low load of the turbine, spring 27 overcomes the force of the downwardly directed pressure difference on the right end of fulcrumed lever 17, and thereby causes a downward movement of the pilot valve 18 to the effect that oil is drained off from the lower part of cylinder 19 through conduit 24 and spring 22 forces piston 20 downward to close valve 5. It will be understood that the closing movement of piston 20 is initiated by spring 27 and actually performed by spring 22. By properly adjusting spring 27 and a corresponding arrangement of the pilot valve ports, the closing of valve 5 can be effected at a pressure difference which is practically zero. In the present instance I have shown conduit 24 of the pilot valve as being covered by the lower part of pilot valve head 25. If, in this case, the flow decreases to a certain value, spring 27 will move the pilot valve downwardly without at first initiating closing movement of valve 5. Only when the flow in conduit 8 has reached practically zero value will the decreased tension of spring 27 effect further downward movement of pilot valve head 25 to uncover its port connection 24, and thereby permit draining off of fluid from the hydraulic cylinder 19.

When valve 5 is once closed and the pressure in conduit 4 increases, owing to an increase of flow in the turbine, opening movement of valve stem 6 cannot be automatically effected by the differential pressure responsive device in view of the fact that the pressures ahead and behind restriction 8 then are substantially equal. According to my invention I provide a blow-off valve 28 in conduit 15. Opening of this valve at closed valve 5 causes unloading of diaphragm 12 to the effect that the pressure in conduit 16 on diaphragm 13 causes downward movement of rod 14, resulting in an upward movement of the left end of fulcrumed lever 17 against the force of spring 27. The upper pilot valve head thereby uncovers conduit 26 and allows oil or like liquid to be pressed into the lower part of hydraulic cylinders 19 to effect upward movement of piston 20 and opening of valve 6.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:—

1. The combination with a conduit for conveying a fluid, and a valve in the conduit, of means for automatically closing the valve when the flow of fluid in the conduit reaches a predetermined minimum value comprising a restriction in the conduit, a differential pressure responsive device connected to the restriction on opposite sides thereof, and means actuated by the pressure responsive device for completely closing the valve to prevent backflow of fluid in the conduit.

2. The combination with a conduit for conveying a fluid and a valve in the conduit, of means for automatically closing the valve when the flow of fluid in the conduit reaches a predetermined minimum value comprising a restriction in the conduit, a differential pressure responsive device connected to the restriction on opposite sides thereof, a motor control means actuated by the differential pressure responsive device, and a motor regulated by the motor control means for closing the valve to prevent backflow of fluid in the conduit.

3. The combination with a conduit for conveying a fluid and a valve in the conduit, of means for automatically closing the valve in response to the flow of fluid in the conduit comprising a restriction in the conduit, a motor for moving the valve, a pilot valve for the motor, a differential pressure responsive device connected to said restriction and acting on the pilot valve in a direction to maintain said first-named valve opened and a spring acting on the pilot valve in a direction to cause closing of said first-named valve and initiating closing thereof when the flow in the conduit reaches a certain minimum value.

4. The combination with a conduit for conveying a fluid and a valve in the conduit, of means for automatically closing the valve in response to the flow of fluid in the conduit comprising a restriction in the conduit, a motor for moving the valve, a pilot valve for the motor having valve heads and inlet and outlet conduits, the inlet conduit being normally uncovered with respect to one of said heads and the outlet conduit being normally covered by the lower part of said other head, a differential pressure responsive device connected to the restriction on opposite sides thereof and acting on the pilot valve in one direction, and an adjustable spring member acting on the pilot valve in the opposite direction and causing closing of said first-named valve when the flow of fluid in the conduit reaches a certain minimum value.

5. The combination with a conduit for conveying a fluid and a valve in the conduit, of means for automatically closing the valve in response to the flow of fluid in the conduit comprising a restriction in the conduit, a differential pressure responsive device having pipes connected to the conduit ahead and behind of the restriction, a motor control means actuated by the differential pressure responsive device, a motor moved by the motor control means for closing the valve when the flow reaches a minimum value and a blow-off valve in the pipe arranged behind the restriction for unloading one side of said differential pressure responsive means to cause opening movement of the valve.

FRIEDRICH KISSING.